United States Patent
Reimelt et al.

(10) Patent No.: US 7,159,458 B2
(45) Date of Patent: Jan. 9, 2007

(54) APPARATUS FOR DETERMINING AND/OR MONITORING THE FILLING LEVEL OF A PRODUCT IN A CONTAINER

(75) Inventors: Ralf Reimelt, Freiburg (DE); Herbert Schroth, Schopfheim (DE); Armin Wendler, Freiburg (DE)

(73) Assignee: Endress + Hauser GmbH + Co., Maulburg (DE)

( * ) Notice: Subject to any disclaimer, the term of this patent is extended or adjusted under 35 U.S.C. 154(b) by 732 days.

(21) Appl. No.: 09/899,502

(22) Filed: Jul. 6, 2001

(65) Prior Publication Data

US 2002/0023489 A1    Feb. 28, 2002

(30) Foreign Application Priority Data

Jul. 6, 2000    (DE)   ............................ 100 32 775

(51) Int. Cl.
*G01F 23/28*    (2006.01)

(52) U.S. Cl. .................................. 73/290 V

(58) Field of Classification Search .............. 73/290 R, 73/290 V
See application file for complete search history.

(56) References Cited

U.S. PATENT DOCUMENTS

| 4,171,609 | A | * | 10/1979 | Feese ........................ 57/293 |
| 4,976,509 | A | * | 12/1990 | Bachmann et al. ...... 350/96.23 |
| 6,229,476 | B1 | * | 5/2001 | Lütke et al. ................ 342/124 |
| 6,232,769 | B1 | * | 5/2001 | Brunsch et al. ........ 324/207.13 |

FOREIGN PATENT DOCUMENTS

| DE | 44 04 745 C2 | 8/1996 |
| EP | 0 875 738 A1 | 4/1998 |

* cited by examiner

*Primary Examiner*—Hezron Williams
*Assistant Examiner*—Rodney Frank
(74) *Attorney, Agent, or Firm*—Bacon & Thomas

(57) ABSTRACT

A measuring device for determining the filling level of a product or the position of the interface between two media or phases in a container by means of high-frequency measuring signals which are guided along a waveguide. The waveguide comprises a wire cable with a plurality of individual wires of a predetermined diameter which are twisted together.

11 Claims, 4 Drawing Sheets

APPARATUS FOR DETERMINING AND/OR MONITORING THE FILLING LEVEL OF A PRODUCT IN A CONTAINER

FIELD OF THE INVENTION

The present invention relates to an apparatus for determining and/or monitoring the filling level of a product or the position of the interface between two media or phases in a container, with a signal-generating unit, which generates high-frequency measuring signals, a coupling-in unit and a waveguide, the measuring signals being coupled in onto the waveguide via the coupling-in unit and conducted in the direction of the product via the waveguide, and with a receiving/evaluating unit, which determines the filling level of the product or the position of the interface in the container directly or indirectly via the delay time of the measuring signals reflected at the surface or interface of the product.

BACKGROUND OF THE INVENTION

In the case of delay-time methods of determining the filling level using guided electromagnetic measuring signals, different types of waveguides are used. It has become known to use metal rods or tubes as waveguides. Because of their smooth surface, tubes or metal rods are distinguished by the advantages mentioned below:
  low attenuation of the high-frequency measuring signals;
  reduced tendency for the formation of deposits;
  low tensile forces in bulk materials;
  since there is in any case a small flexibility, the diameter of the rod can be chosen to be large without further restricting functionality. This leads to a further reduction in the attenuation of the high-frequency measuring signals, since the high-frequency surface currents can flow in an enlarged surface area. Furthermore, the undesired influence of adhering product (absent echoes, attenuation of the measuring signals, measuring errors due to changed propagation velocity of the measuring signals) is reduced as a result, since the radial extent of the field is increased with a larger waveguide diameter. As a result, the direct surroundings of the waveguide play a more minor role.

However, the use of metal rods or tubes for delay-time measurements with guided high-frequency measuring signals also has disadvantages. These are listed below:
  more difficult transport, if the tubes or metal rods are delivered in one piece;
  if the rod/tube is made such that it can be dismantled for easy transport (for example screwed with threaded bolts), the flexural and/or tensile load-bearing capacity is reduced;
  in bulk materials, there is the risk of an irreversible deformation of the rod/tube caused by the effect of lateral forces
  in bulk materials, high torques are transferred, which may lead to damage of the coupling-in element itself or to the silo;
  it is scarcely possible to install the rigid sensor in partly filled solid-material silos.

In addition, it has become known to use bare wire cables, known as 6×19+SEL wire cables, as waveguides for filling-level measurement with guided high-frequency measuring signals. These wire cables, which are twisted stranded wires, have the following advantages:
  high flexibility, allowing the wire cables to be transported in the rolled-up state;
  uncomplicated installation of the same in partly filled solid-material silos;
  only tensile forces are transferred, causing at most small torques to act on the coupling-in element.

However, the bare, twisted stranded wires also have disadvantages, which are listed below and make the use of this type of waveguides appear in an unfavorable light for the use aimed for by the invention:
  high attenuation of the high-frequency signals, since the current flowing in the longitudinal direction must pass very many contact points between the individual wires (this is problematical in particular at relatively high frequencies of several GHz, since here the attenuation is in any case already relatively high due to the skin effect);
  at frequencies of several GHz, the attenuation additionally depends on the tensile loading on the cable: acceptable attenuation values are only achieved with high tensile forces of several 1000 N and more. This is presumably to do with the fact that only under tension is there intimate contact of the individual wires of the cable, and consequently a small contact resistance. However, it is precisely lightweight products with small dielectric constants (plastics, powdered media), with which the useful signal is in any case small owing to the low reflection at the surface, that exert low tensile forces on the cable. At low filling levels, these forces are at a minimum, while at the same time the path of the measuring signal on the waveguide is at a maximum, and consequently disturbs the attenuation most.
  low resistance to abrasion (for example in the case of sand or corundum as the filled product), causing the fine individual wires to be rubbed through at the surface after only a short time. Splitting-open wires are a consequence of abrasion, with the effect that the loading at this point is increased further.
  high tensile forces in solid materials as a result of the roughened surface;
  for the same reason, there is a strong tendency for the formation of deposits;
  low resistance to twisting, which can easily lead to destruction of the cable. The structure of the cable with only one outer layer can be seen as the reason for this.

Furthermore, it has become known to use 6×19+SEL wire cables with plastic coating as waveguides for filling-level measurement with guided high-frequency measuring signals. In addition to the advantages shown by bare wire cables, the following advantages also come into effect here:
  better resistance to abrasion, since the tough but pliable plastic does not rub through as quickly—the smooth surface does not offer any points where coarser bulk materials can act abrasively;
  in the case of some plastics (PTFE), there is a reduced tendency for deposits to form because of the low adhesion between plastic and the filled product; the formation of deposits is always very low in the case of all plastics because of the smooth surface.

However, the coated wire cables also have the following disadvantages:
  low temperature and aging resistance;
  restricted suitability for use in explosive atmospheres, since the plastic can be electrostatically charged and consequently represents a possible source of ignition;
  poor tensile load-bearing capacity in relation to tensile forces occurring. The former is dictated by the (small) diameter of the metal core, the latter are proportional to the surface area of the cable and consequently to the (large) diameter of the plastic sheath very high attenuation of the measuring signals, since the dielectric losses add to the conductor losses of uncoated cables.

Taking the prior art as a starting point, the invention is based on the object of optimizing the waveguide.

SUMMARY OF THE INVENTION

The object is achieved according to a first embodiment by the waveguide being a wire cable which comprises a plurality of individual wires of a predetermined diameter, the individual wires being twisted together. The embodiment of the waveguide according to the invention is distinguished by high flexibility, whereby transport and simple installation are ensured. The comparatively large diameter of the individual wires has the effect that their abrasion resistance is very high. For example, cables of the 1×19 type are superior in this respect even to plastic-coated cables. Furthermore, because of the smooth surface of the individual wires, the tensile forces in solid materials are lower than in the case of the rough stranded wires previously used. In addition, the material cross section in the case of the solid individual wires is particularly great. This is reflected in a particularly high tensile load-bearing capacity. Since only the relatively thick individual wires of the outer layer come into contact with the product in the case of the apparatus according to the invention, the number of lossy contact points between the individual wires is very small. The measuring signals consequently only experience low attenuation.

According to an advantageous development of the apparatus according to the invention, the waveguide comprises a plurality of coaxial layers, the individual wires of each layer being twisted in the same direction. The individual layers are preferably twisted in opposite directions. Thus, the waveguide is made up, for example, of 19 individual wires which are arranged in three layers.

In the case of wire cables comprising, for example, three layers, the twisting of two successive layers in opposite directions produces a very high resistance to twisting in the product. The wires are consequently not twisted apart. Among the wire cables produced in the standard way, cables of the 1×19 type have incidentally the lowest attenuation for the measuring signals. One reason for this is that the surface is comparatively smooth; another reason is that the pitch in the outer layer is particularly great, which is advantageous for the current flowing exclusively in the axial direction of the only weakly attenuated fundamental mode of the wave propagation, since comparatively few contact points between the individual wires then have to be overcome. This is reflected in the low losses through the contact points.

The object is achieved according to an alternative embodiment by the waveguide comprising a plurality of pieces connected to one another via a flexible intermediate piece. According to a development of the apparatus according to the invention, the pieces are consequently tubes or rods. It is also provided that the flexible intermediate piece is a wire cable. The connection respectively between a piece and a flexible intermediate piece is preferably made in the form of a crimped connection. As an alternative to wire cables, the intermediate piece may also be made as a universal joint. In order to ensure that the attenuation of the high-frequency measuring signals guided along the waveguide is as low as possible, an advantageous development of the apparatus according to the invention provides that a flexible intermediate piece is enclosed by a tubular mesh, the mesh terminating essentially flush with the surface of the pieces. The ends of the mesh are preferably soldered to the pieces of the waveguide.

The advantages of the solution according to the invention mentioned above and their favorable embodiments can be seen in that no torques are transferred to the coupling-in unit of the waveguide. Furthermore, the longitudinal axis of the coupling-in unit does not necessarily have to coincide with the longitudinal axis of the waveguide. Consequently, there is greater variability in the installation of the filling-level measuring device, for example if the waveguide is set up obliquely through a tank. An oblique arrangement is required for example if the filling level is to be measured right into the outlet of the hopper. This outlet is usually arranged centrally, while the filling level sensor is positioned in the region of the edge of the container cover because the filling device is usually arranged centrally.

The object is achieved according to a further embodiment by the waveguide being a flexible element absorbing the tensile forces occurring (wire cable, plastic cable, hose or the like) which is surrounded on its surface by a metal mesh. This reduces the attenuation, since on the one hand the surface is quite smooth and since on the other hand, even if the current flow between the individual wires is prevented by high contact resistances, altogether only an axial current flows as a result of the braiding in a crisscross arrangement. This is advantageous for the propagation of the low-attenuation fundamental mode on the waveguide, since the radial components of the current in the individual wires compensate for one another, while the axial components of the current are cumulative. The wire cable may be, for example, twisted stranded wires or individual wires.

According to an advantageous development of all the embodiments mentioned above, a defect which serves as a reference for the linear measurement is provided in at least one predetermined region of the waveguide. This defect is preferably defined by a change in the geometry of the waveguide. For example, in the embodiment with a plurality of pieces of the waveguide flexibly connected by an intermediate piece, the reflection of the measuring signal at the transition point between the piece and the intermediate piece can be used as the reference mark. Reference marks are advisable because product adhering to the waveguide above the actual surface of the product generally leads to a lower propagation velocity of the surface wave, as a result of which too low a filling level is indicated if there is no correction by reference marks.

BRIEF DESCRIPTION OF THE DRAWINGS

The invention is explained in more detail on the basis of the following drawings, in which.

DESCRIPTION OF THE PREFERRED EMBODIMENTS

Figure 1:
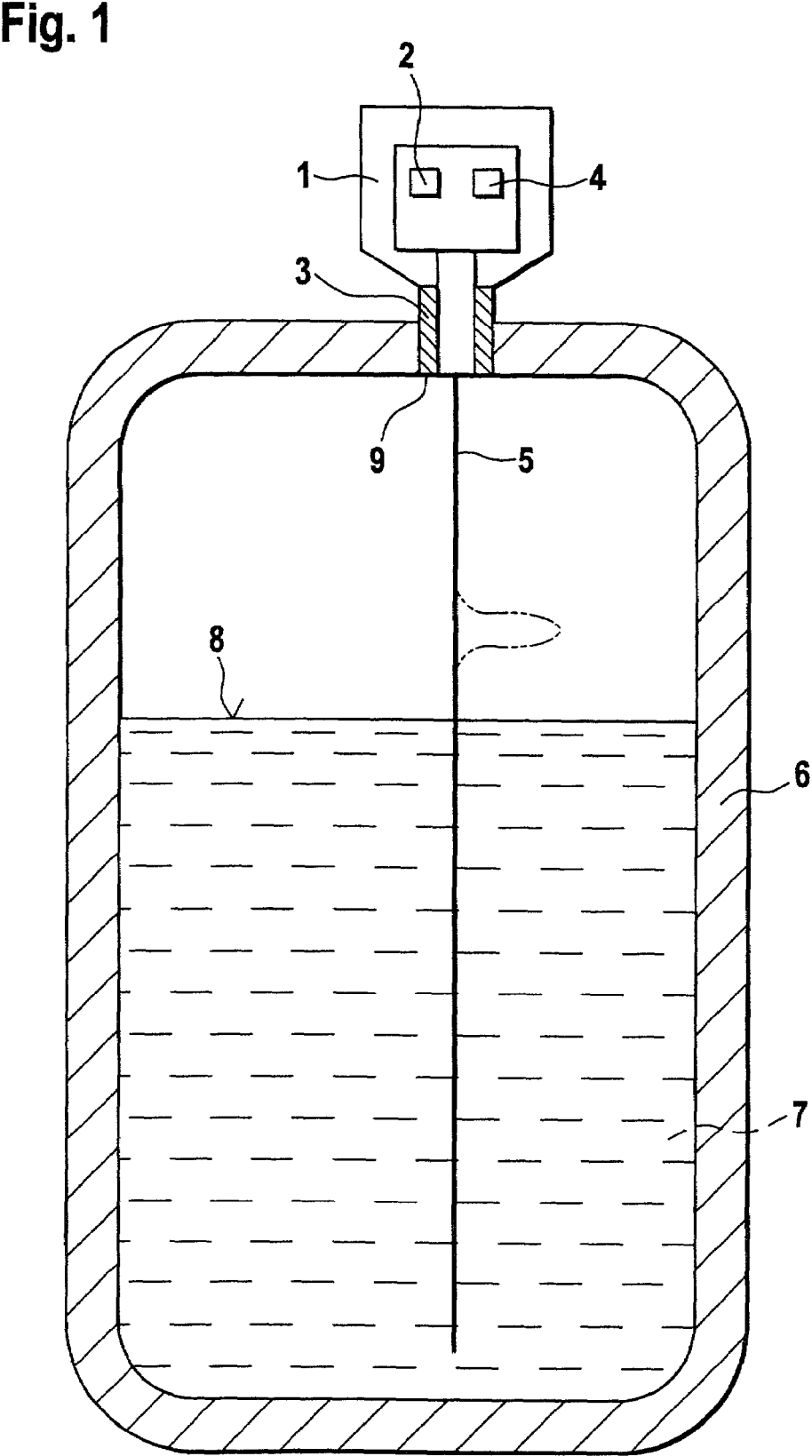
FIG. 1 shows a schematic representation of the apparatus according to the invention.

FIG. 1 shows a schematic representation of the apparatus according to the invention. The product 7 of which the filling level is to be detected is located in the container 6. Mounted in an opening 9 in the cover of the container 6 is the filling-level measuring apparatus 1. High-frequency measuring signals are guided along a waveguide 5 in the direction of the surface 8 of the product 7. Incidentally, a measuring signal is represented in a stylized form in FIG. 1 as a high-frequency pulse. The measuring signals are generated in the signal-generating unit 2 and coupled in onto the waveguide 5 via the coupling-in unit 3. The echo signals reflected at the surface 8 of the product 7 are fed to the receiving/evaluating unit 4 via the coupling-in unit 3. On the basis of the delay time and with knowledge of the height of the container 6, the evaluating unit calculates the filling level of the product 7 in the container 6.

Figure 2:
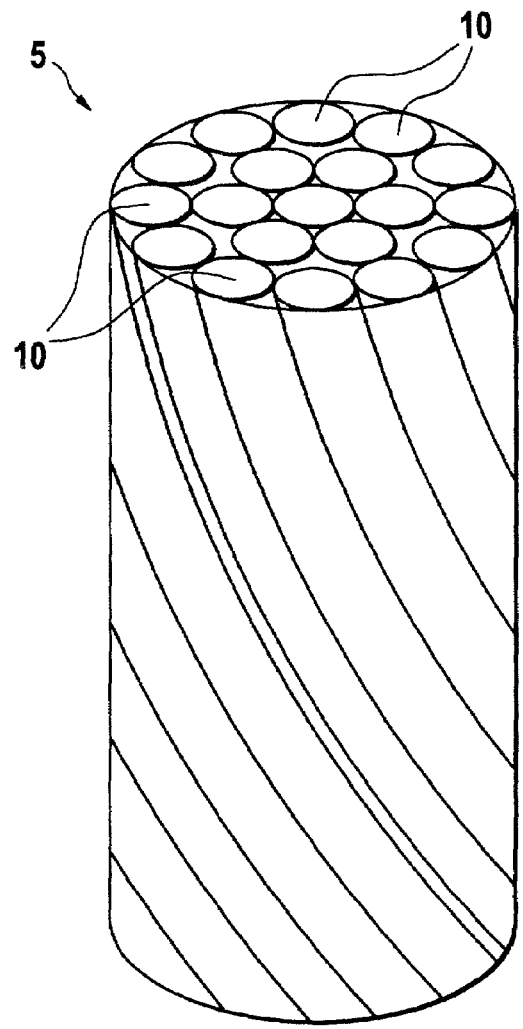
FIG. 2 shows a side view of a waveguide which comprises twisted individual wires.
Figure 3:
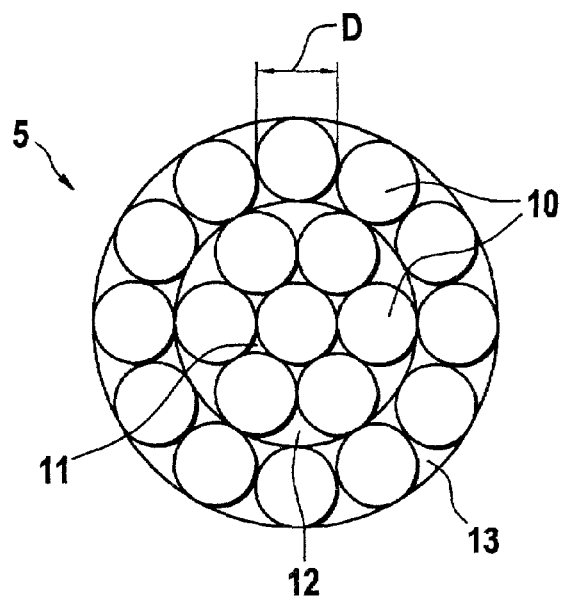
FIG. 3 shows a preferred embodiment of a waveguide comprising a plurality of twisted individual wires in cross section.

FIG. 2 shows a side view of a waveguide 5, and FIG. 3 shows a cross section of a waveguide 5, which comprises twisted individual wires 10. The individual wires have a diameter D. In the case shown, the individual wires are arranged in three layers 11, 12, 13, the layers 12, 13 preferably being twisted in opposite directions in relation to one another. This brings about the advantages already described in detail above. To allow the individual layers 11, 12, 13 to be distinguished better from one another, coaxial lines are depicted in the two figures, FIG. 2 and FIG. 3.

Figure 4:
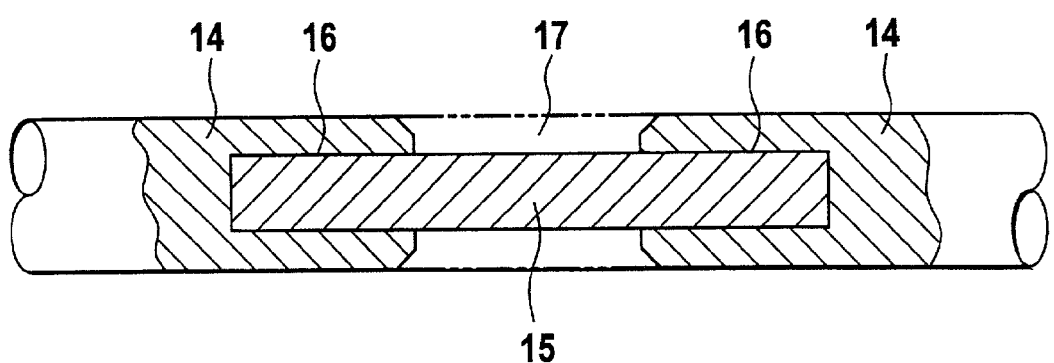
FIG. 4 shows a side view of a further embodiment of the waveguide according to the invention.
Figure 5:
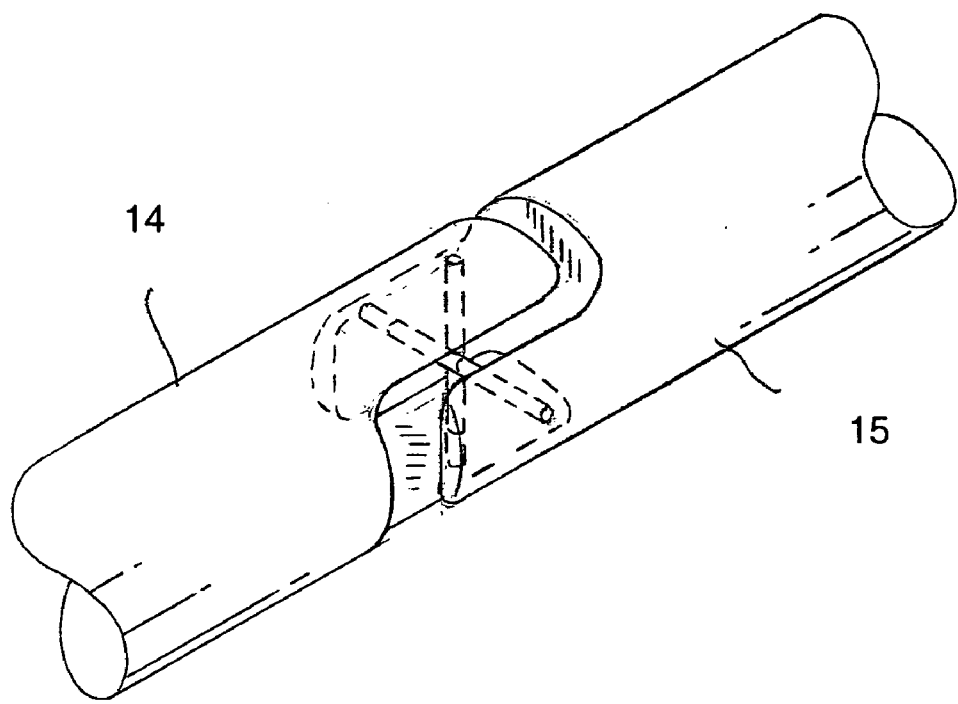
FIG. 5 shows a schematic representation of the apparatus including a universal joint.

In FIG. 4, a side view of a further embodiment of the waveguide 5 according to the invention can be seen. Here, the waveguide 5 comprises a plurality of individual pieces (tubes, rods, etc.) 14, two successive pieces 14 being respectively connected to one another via a flexible intermediate piece 15. The intermediate piece 15 is, for example, a wire cable. The connection 16 respectively between a piece 14 and an intermediate piece 15 is, for example, a universal joint or a crimped connection (FIG. 5). To ensure that the attenuation of the high-frequency measuring signals guided along the waveguide 5 is as low as possible, the flexible intermediate piece 15 is enclosed by a tubular mesh 17, the mesh 17 terminating essentially flush with the adjoining surface of the pieces 14.

What is claimed is:

1. An apparatus for determining and/or monitoring the filling level of a product or the position of the interface between two media or phases in a container, comprising:
   a signal-generating unit which generates high-frequency measuring signals;
   a waveguide which comprises a plurality of pieces which are connected to one another via at least one flexible intermediate piece;
   a coupling-in unit for coupling in onto said waveguide the measuring signals, said waveguide extending in the direction of the product when the apparatus is mounted on the container; and
   a receiving/evaluating unit for determining the filling level of the product or the position of the interface in the container via the delay time of the measuring signals reflected at the surface or interface of the product.

2. The apparatus as defined in claim 1, wherein said flexible intermediate piece comprises a wire cable.

3. The apparatus as defined in claim 1, wherein said flexible intermediate piece comprises a universal joint.

4. The apparatus as defined in claim 1, wherein said pieces are tubes or rods.

5. The apparatus as defined in claim 4, wherein said flexible intermediate piece comprises a wire cable.

6. The apparatus as defined in claim 4, wherein said flexible intermediate piece comprises a universal joint.

7. The apparatus as defined in claim 4, wherein a crimped connection is provided between said piece and said flexible intermediate piece.

8. The apparatus as defined in claim 7, further comprising:
   a tubular mesh which encloses said flexible intermediate piece and which terminates essentially flush with the surfaces of said pieces.

9. An apparatus for determining and/or monitoring the filling level of a product or the position of the interface between two media or phases in a container, comprising:
   a signal-generating unit which generates high-frequency measuring signals;
   a waveguide which comprises a flexible element which is surrounded on its surface by a metal mesh;
   a coupling-in unit for coupling in onto said waveguide the measuring signals, said waveguide extending in the direction of the product when the apparatus is mounted on the container; and
   a receiving/evaluating unit for determining the filling level of the product or the position of said interface in the container via the delay time of the measuring signals reflected at the surface or interface of the product.

10. The apparatus as defined in claim 9, wherein a defect is provided which serves as a reference for the linear measurement in at least one predetermined region of said waveguide.

11. The apparatus as defined in claim 10, wherein said at least one defect is defined by a change in the geometry of the waveguide.

\* \* \* \* \*